United States Patent [19]

Davis

[11] 3,965,267
[45] June 22, 1976

[54] CRYOPULVERIZING AND POST-TREATMENT OF FLAVORING MATERIALS

[75] Inventor: Robert Bruce Davis, Nyack, N.Y.

[73] Assignee: Union Carbide Corporation, New York, N.Y.

[22] Filed: Sept. 17, 1974

[21] Appl. No.: 506,863

[52] U.S. Cl. .................... 426/273; 241/8; 241/23; 426/306; 426/309; 426/444; 426/524
[51] Int. Cl.² .................... A23L 3/36; B02C 21/00
[58] Field of Search .......... 426/444, 327, 518, 519, 426/302, 306, 309, 310, 473, 329, 524, 388, 417, 453, 273; 241/17, 23, 8

[56] References Cited
UNITED STATES PATENTS

| | | | |
|---|---|---|---|
| 2,045,319 | 6/1936 | Watrous | 426/524 X |
| 2,583,697 | 1/1952 | Hendry et al. | 241/23 X |
| 2,786,766 | 3/1957 | Meusel | 426/309 |
| 2,987,399 | 6/1961 | Goering | 426/417 X |
| 3,261,689 | 7/1966 | Ponzoni | 426/310 |
| 3,314,802 | 4/1967 | Cohodas | 241/23 X |
| 3,554,760 | 1/1971 | Sienkiewicz et al. | 426/453 |
| 3,725,076 | 4/1973 | Stefanucci et al. | 426/388 X |
| 3,771,729 | 11/1973 | Frable | 241/23 X |
| 3,804,957 | 4/1974 | Purves | 426/519 X |
| 3,804,963 | 4/1974 | Sienkiewicz et al. | 426/453 |

Primary Examiner—Robert L. Lindsay, Jr.
Assistant Examiner—Kenneth M. Schor
Attorney, Agent, or Firm—Saul R. Bresch

[57] ABSTRACT

A process for comminuting flavoring materials such as spices, coffee and cocoa comprising pulverizing the flavoring material at a cryogenic temperature to form a powder and then agitating the powder until it is capable of forming an aqueous dispersion free of agglomerated particles.

4 Claims, 1 Drawing Figure

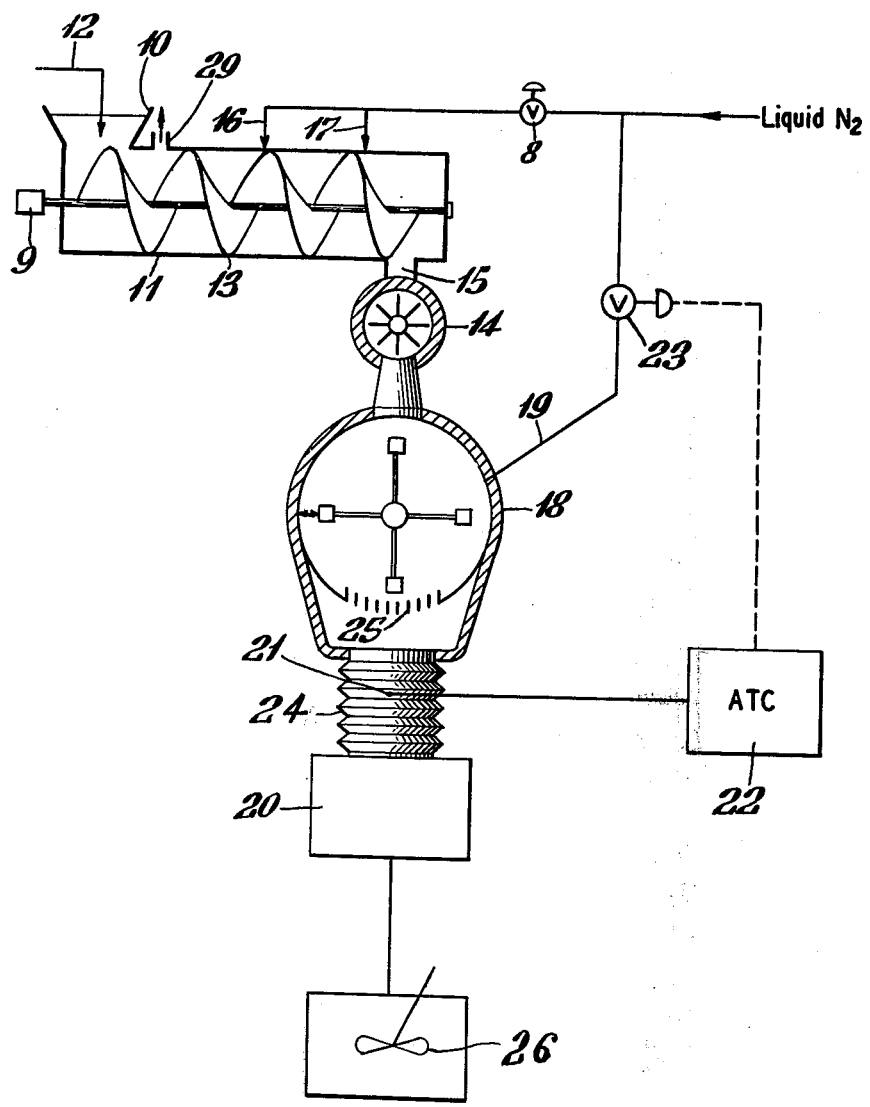

CRYOPULVERIZING AND POST-TREATMENT OF FLAVORING MATERIALS

BACKGROUND

This invention relates, in general, to a process for producing ground flavoring materials which are readily dispersible in aqueous solution. More particularly, the invention relates to a process for producing a mustard seed powder finer than about 70 mesh and capable of forming an aqueous dispersion substantially free of agglomerated particles.

The production of finely divided flavoring materials, on the order of about 70 mesh or finer, is at present a relatively inefficient and cumbersome procedure. This is due primarily to the difficulty of grinding a material, such as mustard seed, which is not in a dry and pulverulent condition, but rather, contains oils and fats which are partially released during comminution, making it extremely difficult to grind the resulting pasty substance. The problem of oil release becomes increasingly troublesome depending upon the extent of comminution. Thus, the quantity of oil released when attempting to grind the mustard seed to a particle size finer than about 70 mesh is frequently sufficient to bring the entire grinding operation to a halt because the released oil converts the finely divided mustard powder into a gumlike material which is practically impossible to pulverize.

One of the key objectives in mustard seed grinding operations is to produce particles sufficiently fine to be suitable for high-grade mustard preparations which form the basis of salad dressings and mayonnaise. This requires a particle size finer than about 70 mesh to insure that the finished product has the desired smoothness and clarity. particles coarser than 70 mesh are generally restricted to the so-called low-grade mustard preparations in which the effect of particle size on the products visual appeal is relatively unimportant.

Conventional processes for comminuting mustard seed comprise an initial aging step wherein the seed is aged from about 6–18 months to facilitate removal of hulls from the seed. This is followed by a dehulling operation in which the aged seeds are passed through a roll mill. The dehulled seeds are then pulverized using conventional milling techniques to produce a product approximately 70% of which is finer than 70 mesh (the desired particle size); the remaining 30% comprises the oversized material and represents the major source of inefficiency in the overall process.

In an attempt to improve the efficiency of grinding oily spices and flavoring materials cryogenic comminution processes have been suggested in the art. U.S. Pat. No. 3,314,802 to Cohodas, for example, discloses a cryogenic process for grinding mustard seed to a particle size of 30 mesh, while U.S. Pat. No. 2,583,697 to Hendry et al discloses a comminution process wherein cacao beans, cocoanut meat and spices such as cloves, nutmeg and pepper (not including mustard) may be ground to extremely fine particle sizes in a hammermill at a temperature of about −200°F. However, these patents fail to address themselves to the problem of producing mustard seed powder capable of being used in highgrade mustard preparations. That is, the cryogenic grinding processes known in the art are either incapable of producing a powder having the requisite particle size (i.e. 70 mesh or finer) or else they fail to produce a powder capable of forming a water dispersion free of agglomerated particles, namely, a powder suitable for use in preparing foodstuffs such as salad dressings and/or mayonnaise. Accordingly, the process of Cohodas results in a relatively coarse mustard seed powder suitable only for low-grade mustard preparations. The process of Hendry et al, on the other hand, although presumably not intended for the grinding of mustard seed, nevertheless, is capable of producing mustard seed particles finer than 70 mesh. However, such powder if added to water would form "clumps" or particles of agglomerated mustard, thereby rendering the process virtually useless insofar as high-grade mustard preparations are concerned.

OBJECTS

Accordingly, it is an object of the invention to provide a process for comminuting flavoring materials to a powder which is readily dispersible in aqueous solution.

It is another object of this invention to provide a cryogenic comminution process for mustard seed such that substantially all of the comminuted product is finer than 70 mesh and readily dispersible in water.

It is still another object of this invention to provide a process for producing finely divided mustard seed powder, suitable for high-grade mustard preparations which eliminates the need for aging and/or dehulling of the seed prior to grinding.

SUMMARY OF THE INVENTION

These and other objects which will become apparent from the detailed disclosure and claims to follow are achieved by the present invention one aspect of which comprises:

a process for comminuting a flavoring material selected from the group consisting of spices, coffee and cocoa to a powder finer than 70 mesh which is readily dispersible in aqueous solution comprising the steps of:

1. feeding the flavoring material to be comminuted into a grinding zone,
2. introducing a cryogenic refrigerant into said grinding zone in sufficient quantity to maintain said flavoring material at a cryogenic temperature,
3. pulverizing said flavoring material in said grinding zone to form a powder finer than 70 mesh,
4. separating said powder from the vaporized cryogenic refrigerant and collecting same, and
5. agitating said powder at a temperature above −100°F until a sufficient quantity of the oil content of the flavoring material is released from the powder to coat its surface thereby producing a powder capable of forming an aqueous dispersion substantially free of agglomerated particles of said flavoring material.

The term "flavoring material" as used herein is intended to encompass the various aromatic vegetable products commonly referred to as spices and condiments, such as mustard, pepper, nutmeg, cinnamon, clove and the like, as well as coffee beans and cocoa beans which are also used in finely divided form to impart flavor to a wide variety of food products.

The term "aqueous solution" as used herein refers to the various liquid vehicles in which the particular flavoring materials of interest are added. Thus, for example, spices such as mustard and pepper are generally added to aqueous solutions which form the basis of food products such as mayonnaise, salad dressings and sauces while cocoa and coffee are dispersed in solutions for use in the manufacture of ice cream, soft drinks and candies.

The term "cryogenic temperature" as used herein is intended to encompass the range of temperatures corresponding to conventional cryogenic fluids such as liquid nitrogen and liquid CO$_2$. Accordingly, comminuting the flavoring materials at a cryogenic temperature refers to temperatures below −100°F with liquid nitrogen being the preferred cryogen.

The present invention is predicated on the discovery of a critical treatment for flavoring materials which have been comminuted at cryogenic temperatures to form powders. The finely divided powders resulting from a cryo-comminution operation are generally incapable of forming commercially acceptable dispersions in aqueous solutions insofar as highgrade food products are concerned because of their inability to form a dispersion substantially free of agglomerated particles. Accordingly, the discovery of the present invention is the realization that the problem of particle agglomeration in aqueous solutions can be substantially eliminated by coating the dry powder with a portion of the essential oils contained within said powder. This is accomplished by agitating the cryogenically ground powder at a temperature above −100°F, preferably at room temperature, until the oil content of the flavoring material is released and mixed throughly with the dry powder. The agitation step can be accomplished by various techniques known in the art, however, agitation in a high intensity propeller mixing device such as a Waring blender or Henschel mixer has been found to be the most effective procedure.

The degree of required agitation and mixing in accordance with the present invention will vary with the operating temperature as well as with the particle size of the comminuted powder. As a general rule, the lower the temperature, the greater the degree of agitation required to release the oil from the flavoring material. However, the temperature should never exceed the deterioration temperature of the flavoring material in question; the deterioration temperature being characterized by an undesirable color change or a physical transition from a solid to a pasty condition. For many spices, such as, thyme and mustard seed, the deterioration temperature is about 96°F although it may be as low as 85°F for other spices such as oregano. Mustard powder, for example, on the order of about 70 mesh is typically agitated at ambient temperature in a mixing device such as a Waring blender for about 1.0 minute in order to achieve satisfactory mixing of the oil and powder. A simple trial and error technique may be initially used to determine if the powder has been sufficiently agitated for purposes of forming an aqueous dispersion free of agglomerated particles. Thus, the presence of objectionable "clumps" of mustard powder can be readily observed by adding as little as 2 grams of powder to 50 ml of water at 70°F. To those skilled in the art, the necessary degree of agitation will be evident from the change in color of the mustard powder during the agitation step from a light yellow to a darker shade characteristic of the desired mixture of oil and powder.

Another important advantage of the present invention is the elimination of the aging and dehulling steps presently being employed in conventional mustard seed comminution operations. This is attributable to the fact that the comminuted powder can now be made sufficiently fine and dispersible in aqueous solution in accordance with the invention so that the black hulls are no longer visible and hence no longer objectionable in terms of affecting the appearance and consistency of the resultant high-grade mustard preparation.

DRAWINGS

FIG. 1 is a schematic flow sheet in partial cross-section illustrating a preferred embodiment of the process of the invention.

DETAILED DESCRIPTION OF THE INVENTION

Referring to FIG. 1, the raw flavoring material to be ground, such as, for example, unaged mustard seeds, (indicated by arrow 12) are fed into feed hopper 10 at the inlet end of screw feed heat exchanger 11. The screw feed 11 conveys the flavoring material, by means of rotating worm 13 driven by variable speed drive means 9, towards the rotary valve 14. A cryogenic refrigerant, such as liquid nitrogen, which is introduced into screw feed 11 through manual restricting valve 8 to refrigerant inlets 16 and 17, cools the incoming feed material by passing counter-current thereto along the length of screw feed 11. The vaporized refrigerant leaves screw feed 11 through vent 29. Rotary valve 14 discharges the embrittled flavoring material into an insulated impact mill 18, such as a hammermill, wherein they are maintained in a dry and embrittled state by contact with the liquid nitrogen refrigerant injected into the mill through refrigerant inlet line 19. Rotary valve 14 serves to prevent vaporized liquid nitrogen in screw feed 11 from being drawn into mill 18 thereby insuring that the incoming feed material is efficiently cooled by counter-current heat exchange. The pulverized material in mill 18 passes through internal screen 25 at the discharge port of mill 18 and falls by gravity or pneumatic conveyance into receptacle 20. Screen 25 is preferably sized to have openings corresponding to particles no greater than about 30 mesh thereby insuring that under practical operating conditions substantially the entire comminuted product passing through the screen will be about 70 mesh or finer. Passageway 24 is preferably a cloth chute having sufficient porosity to allow the refrigerant vapors of nitrogen to pass therethrough into the atmosphere. The comminuted powder is removed from receptacle 20 and allowed to warm up to a temperature of at least −100°F, preferably to ambient temperature, before being placed in mixing apparatus 26, such as a Henschel mixer, wherein the finely divided powder is agitated until the desired mixture of oil and powder is produced.

A temperature sensing element 21 located in the outlet passage 24 of mill 18 is operatively connected to automatic temperature controller means 22 so as to regulate the rate at which liquid nitrogen refrigerant is introduced into impact mill 18. Specifically, temperature sensor 21 cooperates with controller 22 and with the pneumatically operated proportional control valve 23 to regulate the flow rate of liquid nitrogen refrigerant through line 19 such that the temperature at the mill outlet is never allowed to rise above −100°F.

The following examples illustrate the practice of the invention with various flavoring materials in a system such as illustrated in FIG. 1.

EXAMPLE I

Raw unaged mustard seed, at the rate of 320 lbs/hr, was fed into a hammermill equipped with a 20 H.P. motor which drove the hammers at 4612 rcv/min. Liquid nitrogen was fed into the mill at a rate of 427 lbs/hr.

The temperatures at the mill inlet and outlet were −320°F and −200°F, respectively. the internal mill screen was 0.020 inch round hole. 63 lbs. Of ground mustard powder were collected and agitated in a Littleford model FM 130D 10 H.P. batch mixer. The mixer was heated with steam at about 5 psig in the jacket. Mixing was discontinued after 5.5 minutes when the temperature of the powder reached 60°F. The resultant mustard powder was finer than 70 mesh and readily dispersible in water with no formation of agglomerated particles of mustard.

EXAMPLE II

Mustard seed was ground substantially as set forth in Example I except that an 80 lb. batch of cryogenically ground powder was placed in the Littleford model mixer with no steam used to provide heat to the powder. A product highly dispersible in water resulted after 14.5 minutes of mixing. The product temperature was 40°F.

EXAMPLE III

Black pepper, at a feed rate of 23.6 lbs/hr, was pulverized substantially as set forth in Example I except that a 5 H.P. hammermill was used with a hammer RPM of 18,000. The mill inlet and exit temperatures were −320°F and −175°F, respectively. The flow rate of liquid nitrogen was 138.4 lbs/hr. 1.3 lbs. Of ground product were post-treated in a Waring blender for approximately 4 minutes. The treated product was darker in color and was dispersed in aqueous solution much more readily than untreated powder.

EXAMPLE IV

Ground coffee, at a feed rate of 33.9 lbs/hr, was pulverized in the manner set forth in Example III. The flow rate of liquid nitrogen was 176 lbs/hr. 2.4 lbs. Of cryopulverized product were post-treated in a Waring blender for 5 minutes. The treated product was considerably darker in color and its dispersibility in water was improved relative to the untreated product.

What is claimed is:

1. A process for comminuting a flavoring material selected from the group consisting of spices, coffee and cocoa to a powder finer than 70 mesh which is readily dispersible in aqueous solution comprising the steps of:
   1. feeding the flavoring material to be comminuted into a grinding zone,
   2. introducing a cryogenic refrigerant into said grinding zone in sufficient quantity to maintain said flavoring material at a cryogenic temperature,
   3. pulverizing said flavoring material in said grinding zone to form a powder finer than 70 mesh,
   4. separating said powder from the vaporized cryogenic refrigerant and collecting same, and
   5. agitating said powder at a temperature above −100°F but below the deterioration temperature of the flavoring material until a sufficient quantity of the oil content of the flavoring material is released from the powder to coat its surface where said agitation is for a time sufficient to produce a powder capable of forming an aqueous dispersion substantially free of agglomerated particles of said flavoring material.

2. A process as in claim 1 wherein said spice is mustard seed.

3. A process as in claim 1 wherein said cryogenic refrigerant is liquid $N_2$.

4. A process as in claim 2 wherein said agitating step is carried out in a high intensity propeller mixer and wherein said cryogenic refrigerant is liquid $N_2$.

* * * * *